United States Patent
Masaryk et al.

(10) Patent No.: US 11,721,856 B2
(45) Date of Patent: Aug. 8, 2023

(54) BATTERY PACK FOR A VEHICLE

(71) Applicant: Samsung SDI Co., Ltd., Yongin-si (KR)

(72) Inventors: Carl-Michael Masaryk, Graz (AT); Matthias Pucher, Graz (AT); Thomas Bernhard, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 81 days.

(21) Appl. No.: 16/599,465

(22) Filed: Oct. 11, 2019

(65) Prior Publication Data

US 2020/0119417 A1 Apr. 16, 2020

(30) Foreign Application Priority Data

Oct. 12, 2018 (EP) .................................. 18200160
Sep. 30, 2019 (KR) ........................ 10-2019-0121104

(51) Int. Cl.
*H01M 10/6567* (2014.01)
*H01M 10/6556* (2014.01)
(Continued)

(52) U.S. Cl.
CPC ..... *H01M 10/6567* (2015.04); *H01M 10/613* (2015.04); *H01M 10/625* (2015.04);
(Continued)

(58) Field of Classification Search
CPC ........... H01M 10/6567; H01M 10/613; H01M 10/625; F16L 37/0841; F16L 37/08
See application file for complete search history.

(56) References Cited

U.S. PATENT DOCUMENTS 5,647,612 A * 7/1997 Yoshida .................. F16L 21/06
                                                    285/13
2009/0142653 A1* 6/2009 Okada ............... H01M 10/6557
                                                    429/120
(Continued)

FOREIGN PATENT DOCUMENTS

CN      102057532 A     5/2011
CN      104051815 A     9/2014
(Continued)

OTHER PUBLICATIONS

Extended European Search Report issued in EP18200160.2, dated Mar. 14, 2019, 8 pages.
(Continued)

*Primary Examiner* — Maria Laios
*Assistant Examiner* — Jordan E Berresford
(74) *Attorney, Agent, or Firm* — Lewis Roca Rothergerber Christie LLP

(57) ABSTRACT

A battery pack for a vehicle includes: a battery module including a plurality of secondary battery cells; a carrier plate including an integral cooling channel structure having an opening at a side wall of the carrier plate; a liquid cooling circuit in thermal contact with the battery module; and a coupling member. The battery module is on the carrier plate. The integral cooling channel structure is part of the liquid cooling circuit, and the liquid cooling circuit includes a coolant distributor that is in a fluid-tight connection with the integral cooling channel structure at the opening at the side wall. The coupling member and the side wall of the carrier plate respectively include corresponding coupling elements to mechanically connect the coupling member and the carrier plate to each other, and the coupling member further includes a mounting bracket attaching the coolant distributor to the coupling member.

9 Claims, 11 Drawing Sheets

(51) Int. Cl.
*H01M 10/613* (2014.01)
*H01M 10/625* (2014.01)
*H01M 50/262* (2021.01)
*H01M 50/209* (2021.01)

(52) U.S. Cl.
CPC ..... *H01M 10/6556* (2015.04); *H01M 50/209* (2021.01); *H01M 50/262* (2021.01)

(56) References Cited

U.S. PATENT DOCUMENTS

| | | | |
|---|---|---|---|
| 2011/0132580 A1* | 6/2011 | Herrmann | H01M 8/2483 165/104.33 |
| 2011/0212355 A1* | 9/2011 | Essinger | H01M 10/6568 429/120 |
| 2013/0216889 A1 | 8/2013 | Joswig et al. | |
| 2014/0272515 A1 | 9/2014 | Maguire et al. | |
| 2015/0144314 A1 | 5/2015 | Srinivassan et al. | |
| 2017/0104252 A1 | 4/2017 | Wunsche et al. | |
| 2018/0241102 A1* | 8/2018 | Kim | H01M 10/6568 |

FOREIGN PATENT DOCUMENTS

| | | |
|---|---|---|
| CN | 106935927 A | 7/2017 |
| CN | 206379442 U | 8/2017 |
| EP | 2 610 941 B1 | 1/2017 |
| EP | 2 630 397 B1 | 12/2017 |
| EP | 3 522 291 A1 | 8/2019 |
| GB | 1 511 306 A | 5/1978 |
| JP | 2012-180876 A | 9/2012 |

OTHER PUBLICATIONS

Chinese Office action issued in corresponding application No. CN 201910966893.8, dated Aug. 19, 2022, 20 pages with English Translation.

Chinese Office action issued in corresponding application No. CN 201910966893.8, dated May 4, 2023, 15 pages (with English translation).

* cited by examiner

BATTERY PACK FOR A VEHICLE

CROSS-REFERENCE TO RELATED APPLICATIONS

This application claims priority to and the benefit of European Patent Application No. 18200160.2, filed in the European Patent Office on Oct. 12, 2018, and Korean Patent Application No. 10-2019-0121104, filed in the Korean Intellectual Property Office on Sep. 30, 2019, the entire content of both of which are incorporated herein by reference.

BACKGROUND

1. Field

Aspects of embodiments of the present invention relate to a battery pack for a vehicle including a coupling member for coupling components of a cooling circuit.

2. Related Art

In recent years, vehicles for transportation of goods and peoples have been developed using electric power as a source for motion. Such electric vehicles are automobiles that is propelled by an electric motor using energy stored in rechargeable batteries. An electric vehicle may be solely powered by batteries or may be a form of hybrid vehicle powered by, for example, a gasoline generator. Furthermore, the vehicle may include a combination of an electric motor and conventional combustion engine.

Generally, an electric-vehicle battery (EVB) or traction battery is a battery used to power the propulsion of battery electric vehicles (BEVs). Electric-vehicle batteries differ from starting, lighting, and ignition batteries because they are designed to output power for sustained periods of time.

A rechargeable (or secondary) battery differs from a primary battery in that it is designed to be repeatedly charged and discharged, while the latter is designed to provide only an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

Generally, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of (or including) a plurality of unit battery cells coupled to each other in series and/or in parallel so as to provide relatively high energy density, such as for driving a motor of a hybrid vehicle. For example, the battery module may be formed by interconnecting the electrode terminals of the plurality of unit battery cells, the number of unit battery cells being determined based on a desired amount of power, in order to realize a high-power rechargeable battery.

A battery pack is a set of (e.g., a group or pack of) any suitable number of battery modules. The battery modules may be connected to each other in series, parallel, or a mixture of both to provide the desired voltage, capacity, or power density. Components of battery packs include the individual battery modules and interconnects, which provide electrical conductivity between the battery modules. A battery management system (BMS) may be provided to manage the battery pack, such as by protecting the battery module from operating outside its safe operating area, monitoring its state, calculating secondary data, reporting that data, controlling its environment, authenticating it and/or balancing it.

The mechanical integration of such a battery pack is facilitated by suitable mechanical connections between the individual components, for example, the individual components of the battery modules, between the adjacent battery module, and a supporting structure of the vehicle. These connections should remain functional and safe during the average service life of the battery system. Further, installation space and interchangeability requirements must be met, especially in mobile applications.

Mechanical integration of the battery modules can be achieved by providing a carrier framework and by positioning the battery modules thereon. Fixing the battery cells or battery modules may be achieved by fitted depressions in the framework or by mechanical interconnectors, such as bolts or screws. In some cases, the battery modules may be confined by fastening side plates to lateral sides of the carrier framework. Further, cover plates may be fixed atop and below the battery modules.

The carrier framework of the battery pack is mounted to a carrying structure of the vehicle. When the battery pack is fixed at the bottom (e.g., the bottom side) of the vehicle, the mechanical connection may be established from the bottom side of the vehicle by, for example, bolts passing through the carrier framework of the battery pack. The framework may be made of (or may include) aluminum or an aluminum alloy to reduce the total weight of the construction. Battery systems according to the related art, despite any modular structure, generally include a battery housing that acts as an enclosure to seal the battery system against the environment and provides structural protection of the battery system's components. Housed battery systems are generally mounted as a whole (e.g., as a unit) into their application environment, for example, an electric vehicle.

To provide thermal control of the battery pack, a thermal management system may be employed to safely use the battery module(s) by efficiently emitting, discharging, and/or dissipating heat generated from the rechargeable batteries. If the heat emission/discharge/dissipation is not sufficiently performed, temperature deviations occur between the battery cells, such that the battery module may not generate a desired amount of power. In addition, an increase of the internal temperature may lead to abnormal reactions occurring in the battery cells, causing charging and discharging performance of the rechargeable battery to deteriorate and the life-span of the rechargeable battery to be shortened. Thus, battery cell cooling for effective emitting/discharging/dissipating heat from the battery cells is desired. As such, high voltage traction battery systems almost always include a thermal condition system in order to fulfill lifetime and performance requirements.

The thermal management system may include a cooling circuit (e.g., a liquid cooling circuit). Generally, the liquid cooling circuit may include several components, such as cooling plates in thermal contact with the battery modules, pipes or hoses for forwarding (or transporting) the liquid coolant, and coolant interfaces for connecting the pipes or hoses with the cooling plates and to a vehicle's cooling circuit. Assembling the parts of a related art cooling system generally involves several steps that often need to be done manually.

In the related art, a plastic coolant interface may include a coupling element that is inserted into a cooling port at the cooling plate. The coupling elements may, for example, bear (or include) a sealing ring to ensure tightness of the connection. The plastic coolant interface may further include a mechanical fixing that is configured to interact with a corresponding fixing structure at the cooling plate. In the related art, such a mechanical connection is generally realized by a screw connection or latching elements. However, due to the increased number of parts, the assembling process is more complex and automatization more difficult. Furthermore, metal inserts are required at the plastic coolant interface to mount the screw connection. Even further, tolerance is critical for ensuring tightness of the connection which may be deteriorated due to the addition mechanical fixation element at the coolant interface.

SUMMARY

One or more of the drawbacks of the prior art are avoided or at least mitigated according to embodiments of the present invention, as will be described below. That is, according to embodiments of the present invention, at least some of the drawbacks of the prior art are overcome or at least mitigated and a battery system in which the assembly effort is low and tightness as well as mechanical fixing during daily operation is ensured is provided. For example, a cooling circuit that stays tight under all environmental and working conditions and that can be easily assembled is provided.

According to an embodiment of the present invention, a battery pack for a vehicle is provided. The battery pack includes: a battery module including a plurality of secondary battery cells; a carrier plate; a liquid cooling circuit; and a coupling member. The battery module is on a top surface of the carrier plate, and the carrier plate includes an integral cooling channel structure. An opening to the integral cooling channel structure is at a side wall of the carrier plate. The liquid cooling circuit is in thermal contact with the battery module. The integral cooling channel structure is part of the liquid cooling circuit, and the liquid cooling circuit includes a coolant distributer connected in a fluid-tight manner to the integral cooling channel structure at the opening. The coupling member and the side wall of the carrier plate respectively include corresponding coupling elements mechanically connecting the coupling member and the carrier plate to each other. The coupling member further includes mounting brackets attaching the coolant distributor to the coupling member.

Aspects of embodiments of the present invention are directed to a process of assembling a fluid connection between cooling plates and coolant interfaces. For example, cooling plates are generally made of (or include) a metal material, and coolant interfaces are generally made of (or include) plastic. The assembly process, according to embodiments of the present invention, ensures tightness (e.g., fluid-tightness) of the coupling between the cooling plate and coolant interface during daily operation and also ensures mechanical fixing of the coolant interface to the cooling plate.

According to an embodiment of the present invention, the battery pack includes a separate coupling member for connecting the coolant distributor and the cooling channels of the carrier plate to each other. One aspect of embodiments of the present invention is a mechanical connection between the coolant circuit elements and the carrier plates and a separate fluid connection between the coolant distributor and the cooling channel embedded in the carrier plate. Thus, the coupling member is designed to ensure an easy and durable mechanical attachment to the carrier plate and, in addition, an easy and safe fluid-tight connection between the coolant circuit components, such as between the coolant distributor and the cooling channels of the carrier plate, is ensured.

For the mechanical attachment, the coupling member and the side wall of the carrier plate include a pair of corresponding coupling elements. One skilled in the art may consider coupling elements, such as a friction-type connectors or a force-type connectors, to mechanically couple the carrier plate and the coupling member to each other. The coupling member may include one or more coupling elements, and the carrier plate will include a corresponding number of corresponding coupling elements positioned such that, when the coupling elements are attached to each other, a durable mechanical connection is ensured. The coupling elements of the coupling member assure mechanical fixation of the coolant distributor to the carrier plate and, thereby, simplifies the assembly process of both components at least because, as one example, no additional fixation means, such as screws, are needed. The robust and durable mechanical fixation provided by embodiments of the present invention may handle mechanical loads, such as vibration, safely.

The coupling member includes mounting brackets for attachment to the coolant distributor. The mounting brackets are designed to hold the coolant distributor in place when the fluid connection between the cooling channels embedded in the carrier plate and the coolant distributor is established. No additional fixation means, such as screws, are necessary to mount the coolant distributor to the coupling member, and the resulting attachment is durable and robust and can resist mechanical loads in various directions.

According to one embodiment of the present invention, the coupling member includes a support plate, and the mounting brackets may be arranged on one side of the support plate with the coupling elements arranged on the opposite side of the support plate. For example, the mounting brackets are positioned on the upper surface of a support plate to be easily accessible when fixing (e.g., installing) the coolant distributor. The coupling elements are positioned on the same support plate but on the opposite, lower surface, which fits closely to (e.g., which contacts or nearly contacts) the side wall of the carrier plate. The support plate, when fixed to the carrier plate, covers the side wall of the carrier plate, and the support plate includes a passage aligned with (e.g., arranged above) the opening of the integral cooling channel structure. The part of the coolant distributor which establishes the fluid connection is inserted into the opening of the integral cooling channel structure of the carrier plate through the passage. The passage may include secure elements to prevent or reduce twisting to ensure tightness of the fluid connection in daily use.

According to another embodiment of the present invention, the coupling elements for fixing the coupling member to the carrier plate are self-locking clamp elements, such that no additional fixation means, like screws, etc., are necessary.

According to another embodiment of the present invention, the mounting brackets and the passage in the support plate are arranged in the same section of the support plate. Hence, the coolant distributor is fixed at the same part of the support plate that establishes the fluid connection with the integral cooling channel structure of the carrier plate. This feature further improves the robustness of the fluid connection.

In some embodiments of the present invention, the coolant distributor may include a tubular portion extending in a first direction and one or more intersection portion(s) extending perpendicular to the tubular portion. The intersection portion is configured to establish fluid connection between the coolant distributor and the opening of the integral cooling channel structure in the carrier plate. The mounting brackets include a clip element that, when closed, encircles (e.g., surrounds) and fixes the tubular portion. According to this embodiment, the coolant distributor is formed as a tube which bears (or includes) the intersection portions at its circumferential wall. The mounting brackets are configured to encompass the circumferential wall.

The clip element may include a first half shell and a second half shell. The first half shell is firmly attached to the support plate, and the second half shell is moveably attached to one side (e.g., one end) of the first half shell for opening and closing the clip element. For example, one of the half shells is attached to the support plate, and the other one of the half shells is moveably coupled to the fixed half shell. When the coolant distributor is inserted into the coupling member, the hinged (or movable) half shell is closed. Thus, attachment of the coolant distributor to the support plate is simplified and the assembly process may be automated. The first and second half shells together fully encompass (e.g., extend entirely around) the circumference of the coolant distributor, but the first and second half shells may have the different dimensions. For example, the first half shell may extend over a smaller part of the circumference of the coolant distributor than the part of the circumference of the coolant distributor that is covered by the second half shell.

Further aspects and features of the present invention may be learned from the following description, described in conjunction with the appended drawings, and the claims.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Figure 1:
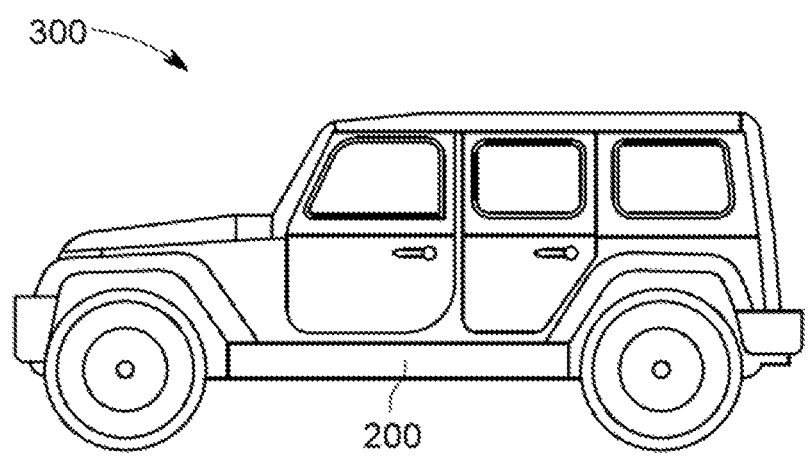
FIG. 1 is a schematic illustration of a vehicle including a battery pack.

Reference will now be made, in detail, to embodiments of the present invention, examples of which are illustrated in the accompanying drawings. Aspects and features of the present invention, and implementation methods thereof, will be described with reference to the accompanying drawings.

In the drawings, like reference numerals denote like elements, and redundant descriptions thereof may be omitted. As used herein, the term "and/or" includes any and all combinations of one or more of the associated listed items. Further, the use of "may" when describing embodiments of the present invention refers to "one or more embodiments of the present invention."

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

Herein, the terms "upper" and "lower" are defined according to the z-axis in the drawings. For example, the upper side is positioned at the upper part of the z-axis, and the lower side is positioned at the lower part thereof. But it will be understood that the spatially relative terms are intended to encompass different orientations of the device in use or operation in addition to the orientation depicted in the figures. In the drawings, the sizes of elements may be exaggerated for clarity. For example, in the drawings, the size or thickness of each element may be arbitrarily shown for illustrative purposes, and thus, the embodiments of the present invention should not be construed as being limited thereto.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

Battery packs of electric or hybrid vehicles demand huge space and, therefore, are generally positioned at the lower side of the vehicle body. For example, the battery pack may be fixed to a floor of a vehicle carrying structure (e.g., a vehicle frame). Related art battery packs, despite any modular structure, generally include a battery housing that acts as an enclosure to seal the battery pack against the environment and provides structural protection for the battery pack's components. Housed battery packs are generally mounted as a whole (e.g., as a unit) into their application environment, for example, an electric vehicle. In some cases, the battery pack may be structurally integrated into the vehicle carrying structure and may include attachment devices that are connected to the vehicle body for structural integration. For example, the vehicle body may include the battery system carrier, and the battery system carrier may be directly integrated into the vehicle body instead of being mounted or attached to the vehicle body. Embodiments of the present invention may be realized in any of these variants.

Figure 2:
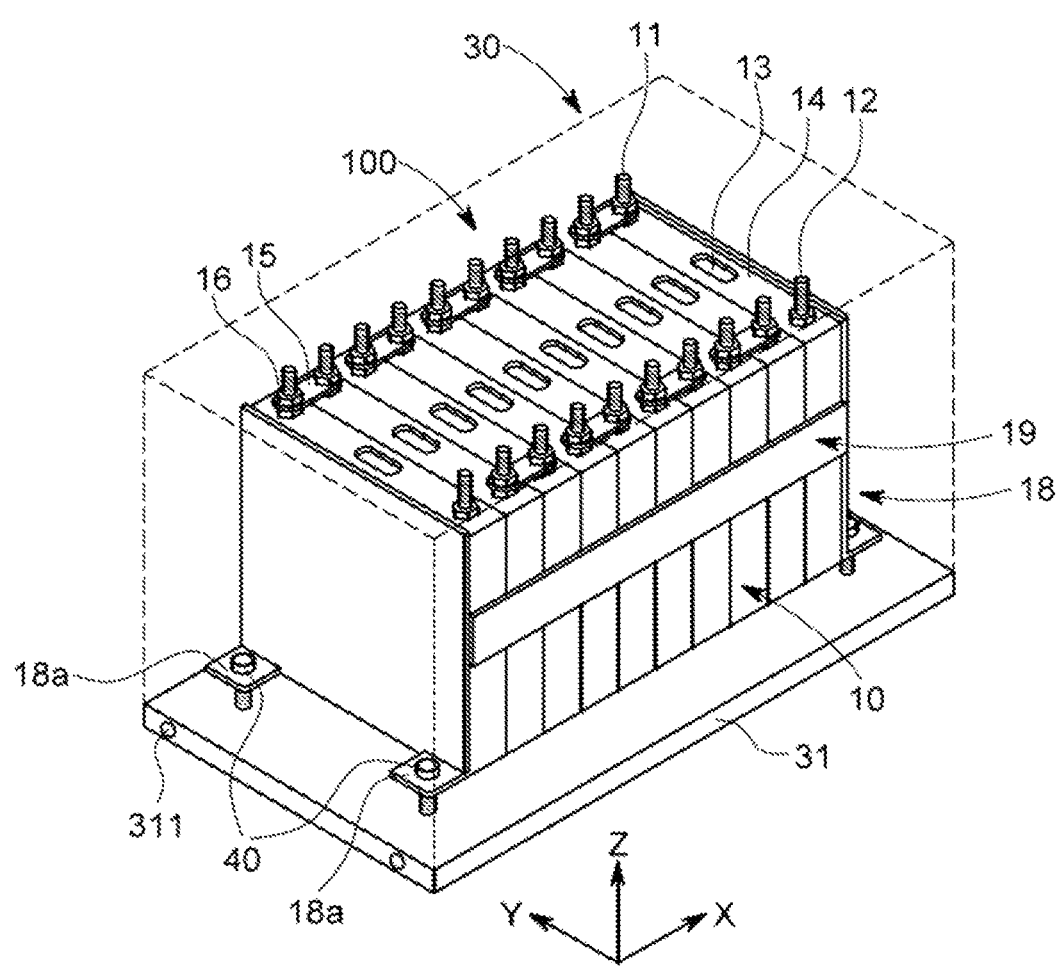
FIG. 2 is a perspective view of a battery module.

FIG. 1 is a schematic illustration of a vehicle 300 including a battery pack 200 mounted to the floor of a carrying structure (e.g., a frame) of the vehicle 300, and FIG. 2 is an illustration of a battery module 100 according an embodiment of the present invention. Referring to FIG. 2, the battery module 100 includes a plurality of battery cells 10 aligned in one direction and a heat exchange member (e.g., a heat exchanger) adjacent to a bottom surface of the plurality of battery cells 10. A pair of end plates 18 are provided to face wide surfaces of the battery cells 10 at the outside of the battery cells 10 (e.g., the outsides of the outermost ones of the battery cells 10), and a connection plate 19 connects the pair of end plates 18 to each other, thereby fixing the plurality of battery cells 10 together. Fastening portions 18a on both sides of the battery module 100 are fastened to a carrier plate 31 by bolts 40. Thus, a top surface of the carrier plate 31 supports the battery module 100 (e.g., supports the battery cells 10). The carrier plate 31 may be part of a module housing 30.

In the embodiment illustrated in FIG. 2, each battery cell 10 is a prismatic (or rectangular) cell, and the wide, flat surfaces of the battery cells 10 are stacked together (e.g., are stacked adjacent each other) to form the battery module 100. Further, each battery cell 10 includes a battery case accommodating an electrode assembly and an electrolyte. The battery case is hermetically sealed by a cap assembly 14. The cap assembly 14 is provided with positive and negative electrode terminals 11 and 12 having different polarities from each other and a vent 13. The vent 13 is a safety device of the battery cell 10, which acts as a passage through which gas generated in the battery cell 10 can be exhausted to the outside of the battery cell 10. The positive and negative electrode terminals 11 and 12 of neighboring battery cells 10 are electrically connected to each other through a bus bar 15, and the bus bar 15 may be fixed to the positive and negative electrode terminals 11 and 12 by a nut 16 or the like. Hence, the battery module 100 may be used as power source unit by electrically connecting the plurality of battery cells 10 to each other as one bundle. The battery pack 200 may include a plurality of battery modules 100.

Generally, the battery cells 10 generate a large amount of heat while being charged/discharged. When the generated heat accumulates in the battery cells 10, the battery cells 10 may deteriorate at an accelerated rate. Therefore, the carrier plate 31 of the battery module 100 further includes an integral cooling channel structure (e.g., an integral cooling channel) having two inlet openings 311 at a side wall of the carrier plate 31. The integral cooling channel structure is provided adjacent to the bottom surface of the battery cells 10 to cool the battery cells 10. The integral cooling channel structure includes a hollow profile including coolant channels that fluidly connect the inlet openings 311 of the integral cooling channel structure to outlet openings of the integral cooling channel structure, which are at an opposite side wall of the carrier plate 31. The hollow profile may have various cross-sectional shapes, such as a circular or a rectangular cross-sectional shape. In some embodiments, the hollow profile is an extruded aluminum profile. Such lightweight extruded profiles can be easily and cost-effectively manufactured.

The integral cooling channel structure is part of a liquid cooling circuit of the battery pack 200. The cooling circuit may include several other components in addition to the carrier plates 31 with the integral cooling channel structures, such as pumps, pipes or hoses for forwarding (or transporting) the liquid coolant, and coolant distributors or interfaces for connecting the pipes or hoses to the carrier plates 31 and to a vehicle's cooling circuit.

Aspects of embodiments of the present invention are directed to the process of assembling a fluid connection to the carrier plates. FIGS. 3A-3F schematically illustrate aspects of this process according to an embodiment of the present invention, which may be subdivided into steps (a) and (b).

Figure 3A:
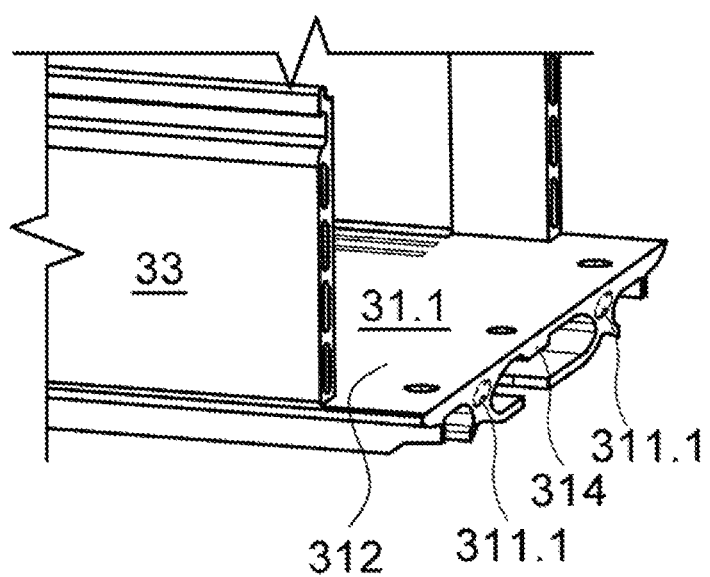
FIGS. 3A-3F are schematic illustrations of the process of assembling a fluid connection of a battery pack cooling circuit to a carrier plate including an integral cooling channel structure according to an embodiment of the present invention.
Figure 3B:
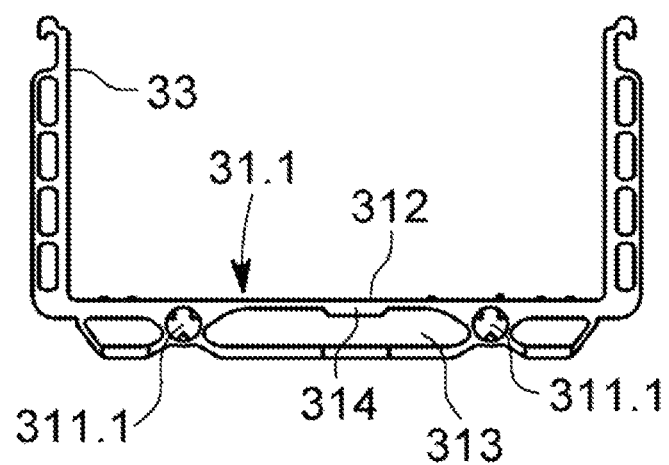
Figure 3C:
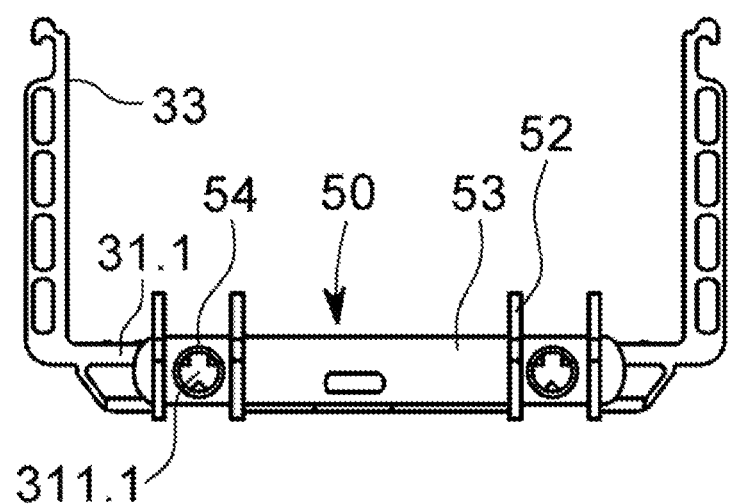
Figure 3D:
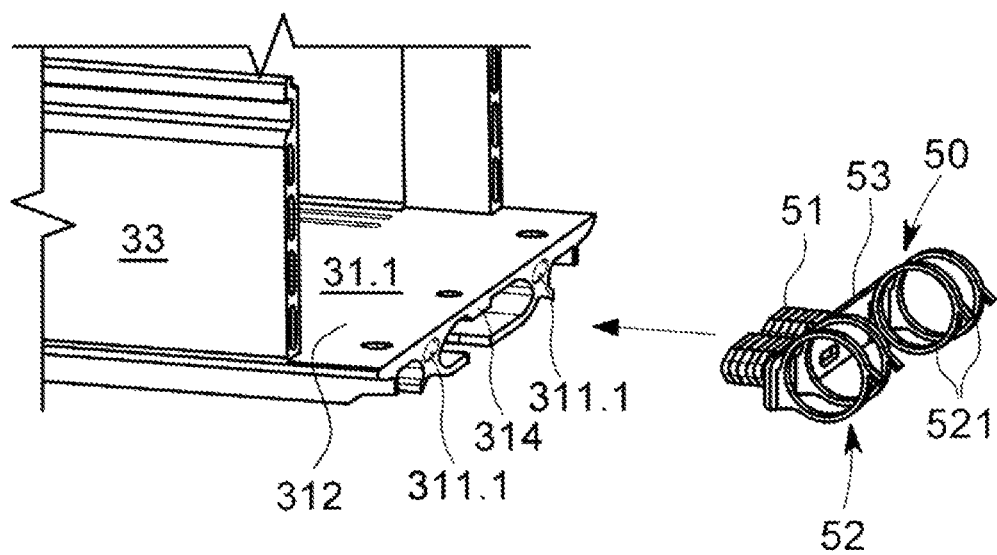

Referring to FIGS. 3A-3D, in step (a), a carrier plate 31.1 is provided, which, together with two side plates 33, forms a housing for a battery module. FIG. 3A is a perspective view from one of the longitudinal ends of the housing, and FIGS. 3B and 3C are side views of the housing. The side plates 33 and the carrier plate 31.1 may be made of (or may include) extruded aluminum. The battery cells of the battery module will be placed on a top surface 312 of the carrier plate 31.1. Two inlet openings 311.1 are provided at a side wall of the carrier plate 31.1 to the left and right of a centrally-located junction area 313. The inlet openings 311.1 are in fluid communication with (e.g., are open to) the integral cooling channel structure of the carrier plate 31.1. Outlet openings of the integral cooling channel structure are provided at an opposite side wall of the carrier plate 31.1.

In step (a), a coupling member 50 (see, e.g., FIG. 3D) is attached to the side wall of the carrier plate 31.1 (e.g., the side wall of the carrier plate 31.1 at where the inlet openings 311.1 are provided). The coupling member 50 may be made of (or may include) plastic, but the present invention is not limited thereto. The coupling member 50 includes a coupling element 51, which corresponds to (e.g., which is configured to be coupled to) a coupling element 314 in the junction area 313 of the side wall of the carrier plate 31.1. The corresponding coupling elements 51 and 314 are configured to establish a mechanical connection between the coupling member 50 and the carrier plate 31.1. In the illustrated embodiment, the coupling element 51 of the coupling member 50 is a tube-like extension having a rippled surface structure. The coupling element 314 at the carrier plate 31.1 is a beat portion (e.g., a protruding portion) configured to snap into the rippled surface structure of the coupling element 51 when the coupling member 50 is inserted into the junction area 313.

The coupling member 50 further includes mounting brackets 52 for attachment of a coolant distributor 60. In the illustrated embodiment, the coupling member 50 includes a support plate 53. The mounting brackets 52 are arranged on one side of the support plate 53, and the coupling element 51 is arranged on the opposite side of the support plate 53. The support plate 53, when fixed to the carrier plate 31.1, will cover the side wall of the carrier plate 31.1 as shown in FIG. 3C.

The support plate 53 further includes a plurality of (e.g., two) passages 54 aligned with (e.g., arranged above) the inlet openings 311.1 of the integral cooling channel structure. According to the illustrated exemplary embodiment, the mounting brackets 52 for attachment of the coolant distributor 60 and the passages 54 in the support plate 53 are arranged in the same section of the support plate 53. For example, the mounting brackets 52 (e.g., each of the mounting bracket 52) include a pair of clip elements 521 that, when closed, encircle and fix a tubular portion 61 of the coolant distributor 60. The passages 54 may be positioned between adjacent ones of the clip elements 521. Thus, when the coupling member 50 is attached to the carrier plate 31.1, the pair of clip elements 521 will be positioned closely left and right of the passage 54.

Figure 3E:
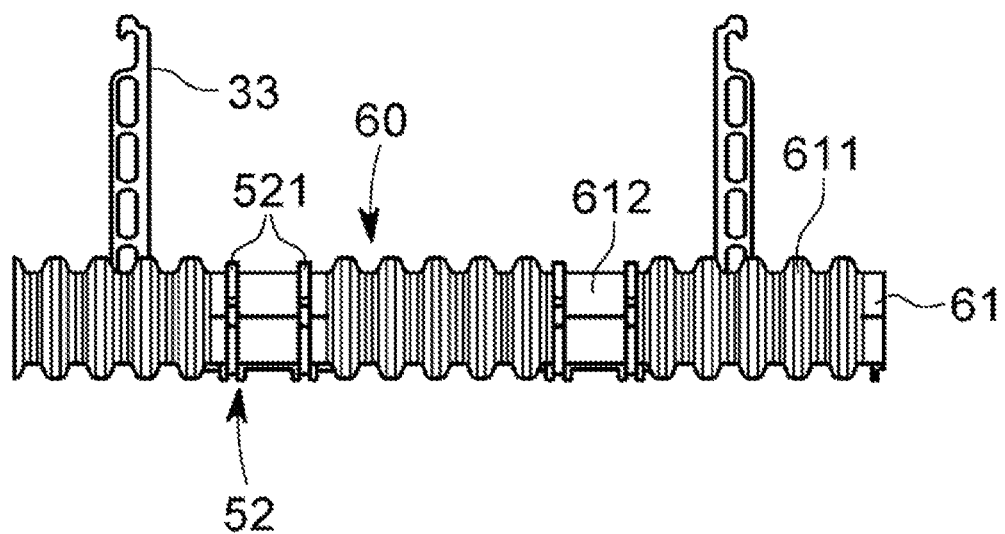
Figure 3F:
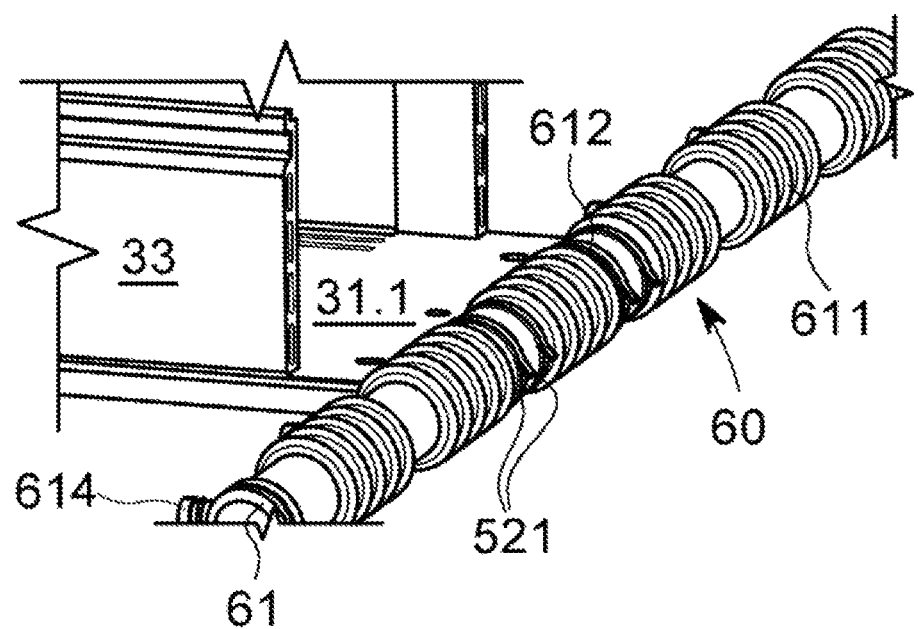

In step (b) of the process, aspects of which are shown in the FIGS. 3E and 3F, the coolant distributor 60 is snapped onto the coupling member 50. The coolant distributor 60 includes the tubular portion 61 extending parallel to the longitudinal direction of the side wall of the carrier plate 31.1. The tubular portion 61 has bulge sections 611 to compensate for production tolerances and damp vibration. The tubular portion 61 also has flat sections 612 where the clip elements 521 encircle the tubular portion 61. Furthermore, an intersection portion 614 extending perpendicular to the tubular portion 61 is provided at the flat sections 612. The intersection portion 614 is configured to establish fluid connection between the coolant distributor 60 and the inlet opening 311.1 of the integral cooling channel structure of the carrier plate 31.1. In some embodiments, the intersection portion 614 has the contour of a hose attachment and includes a sealing device, such as sealing rings. Thus, when the intersection portion 614 of the coolant distributor 60 is inserted through the passage 54 of the support plate 53 into the inlet opening 311.1, a fluid-tight connection is established between the coolant distributor 60 and the carrier plate 31.1. The coolant distributor 60 will then be fixed to the coupling member 50 via the clip elements 521.

Figure 4:
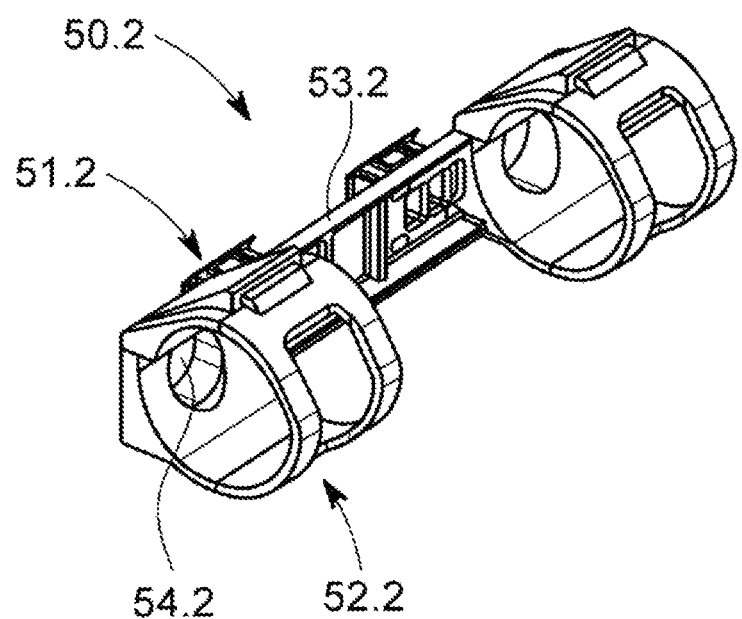
FIGS. 4-6 illustrate a coupling member according to an embodiment of the present invention.
Figure 5:
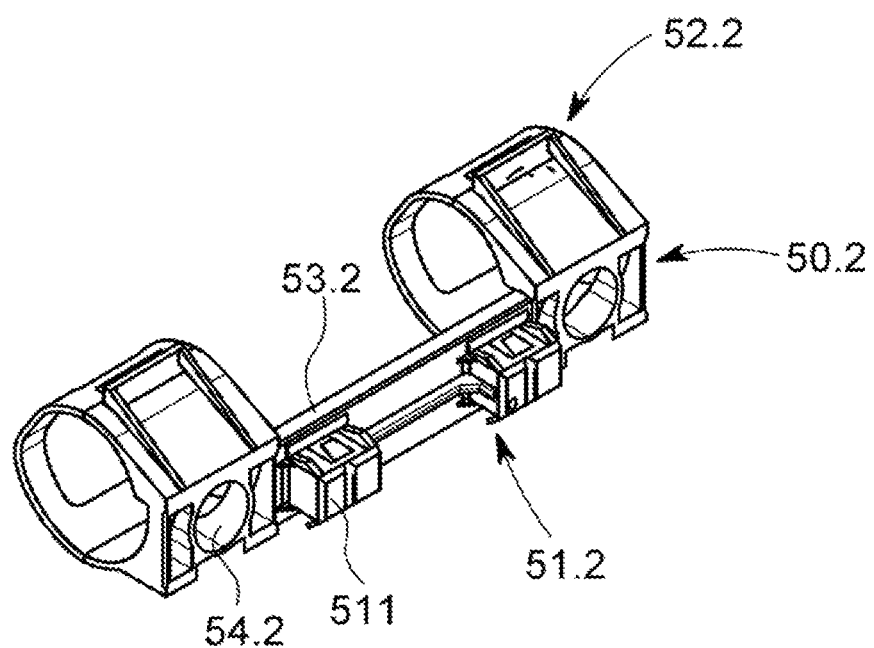
Figure 6:
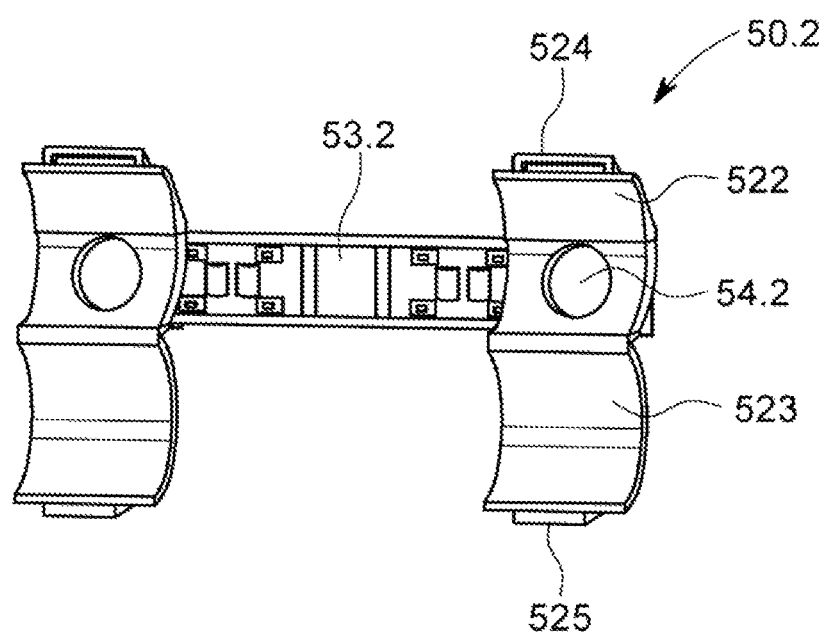

FIGS. 4-6 illustrate a coupling member 50.2 according to another embodiment of the present invention. FIGS. 4 and 5 are front and back views, respectively, of the coupling member 50.2, and FIG. 6 shows the coupling member 50.2 with the mounting brackets 52.2 in an open state. The coupling member 50.2 is configured to couple the coolant distributor 60 in the same or substantially similar manner as the coupling member 50 shown in FIGS. 3A-3F with respect to the carrier plate 31.1 including corresponding coupling elements corresponding to coupling elements 51.2. The coupling member 50.2 includes a support plate 53.2, and the coupling elements 51.2 are positioned at the backside of the support plate 53.2 while the mounting brackets 52.2 are positioned at the front side of the support plate 53.2. The passages 54.2 are positioned to be aligned with (e.g., to be above) the inlet openings 311.1 at the side wall of the carrier plate 31.1 when mounted thereto.

In the illustrated embodiment, the mounting brackets 52.2 are clip elements and each includes a first half shell 522 and a second half shell 523 (see, e.g., FIG. 6). The first half shell 522 is firmly attached to (e.g., is fixed to) the support plate 53.2, and the second half shell 523 is moveably attached to one side of (e.g., a distal end of) the first half shell 522 for opening and closing the clip element. The free sides of the first half shell 522 and the second half shell 523 (e.g., the distal ends of the first and second half shells 522 and 523) respectively bear (or include) locking elements 524 and 525, which snap together when the mounting bracket 52.2 is closed.

In the illustrated embodiment, the coupling elements 51.2 for fixing the coupling member 50.2 to the carrier plate 31.1 are configured as self-locking clamp elements. In this embodiment, the coupling elements 51.2 include a metal spring 511 configured to snap into a corresponding recess at the carrier plate 31.1 when the coupling member 50.2 is attached thereto.

Although example embodiments of the present invention have been described and illustrated herein, many modifications and variations within those embodiments will be apparent to those skilled in the art. Accordingly, it is to be understood that the present invention may be embodied in forms other than as described herein without departing from the spirit and scope of the present invention. The present invention is defined by the following claims and equivalents thereof.

The invention claimed is:

1. A battery pack for a vehicle, the battery pack comprising:
   a battery module comprising a plurality of secondary battery cells;
   a carrier plate having a top surface and a side wall facing in a different direction than the top surface, the carrier plate comprising an integral first coupling element inside a coupling opening in the side wall of the carrier plate and an integral cooling channel structure having a cooling opening in the side wall of the carrier plate, the coupling opening being separate and spaced apart from the cooling opening in the side wall of the carrier plate, the battery module being on the top surface of the carrier plate;
   a coupling member comprising:
      a second coupling element configured to interact with the first coupling element inside the coupling opening to mechanically connect the coupling member and the carrier plate to each other; and
      a mounting bracket; and
   a coolant distributor in a fluid-tight connection with the integral cooling channel structure and extending into the cooling opening in the side wall of the carrier plate, wherein the coolant distributor is removably retained in position relative to the carrier plate by the mounting bracket of the coupling member.

2. The battery pack of claim 1, wherein the coupling member further comprises a support plate, and
   wherein the mounting bracket is arranged on one side of the support plate, and the second coupling element is arranged on an opposite side of the support plate.

3. The battery pack of claim 2, wherein the support plate, when fixed to the carrier plate, covers the side wall of the carrier plate, and
   wherein the support plate, when fixed to the carrier plate, has a passage aligned with the cooling opening in the side wall of the carrier plate.

4. The battery pack of claim 3, wherein the mounting bracket and the passage in the support plate are in the same section of the support plate.

5. The battery pack of claim 1, wherein the coolant distributor comprises a tubular portion extending in a first direction and an intersection portion extending perpendicular to the tubular portion, the intersection portion being configured to establish fluid connection between the coolant distributor and the cooling opening in the integral cooling channel structure, and
   wherein the mounting bracket comprises a clip element that, when closed, encircles and fixes the tubular portion of the coolant distributor.

6. The battery pack of claim 5, wherein the coupling member further comprises a support plate, and
   wherein the clip element comprises a first half shell and a second half shell, the first half shell being fixed to the support plate, the second half shell being moveably attached to one side of the first half shell for opening and closing the clip element.

7. The battery pack of claim 1, wherein the first and second coupling elements are self-locking clamp elements.

8. The battery pack of claim 1, wherein the second coupling element of the coupling member is configured to be friction-fit into the first coupling element in the side wall of the carrier plate to mechanically connect the coupling member to the carrier plate.

9. The battery pack of claim 1, wherein, when the coupling member is connected to the carrier plate, the cooling opening in the side wall of the carrier plate is positionally between a distal end and a proximal end of the coupling member, and
  wherein the coolant distributor extends from the proximal end of the coupling member to the distal end of the coupling member.

\* \* \* \* \*